(12) United States Patent
Nakamura et al.

(10) Patent No.: US 6,259,493 B1
(45) Date of Patent: Jul. 10, 2001

(54) ACTIVE MATRIX LCD WITH PIXELS ALTERNATELY OVERLAPPED WITH DATA LINES

(75) Inventors: Takashi Nakamura, Kumagaya; Yasuyuki Hanazawa; Kohei Nagayama, both of Fukaya, all of (JP)

(73) Assignee: Kabushiki Kaishi Toshiba, Kawasaki (JP)

( * ) Notice: Subject to any disclaimer, the term of this patent is extended or adjusted under 35 U.S.C. 154(b) by 0 days.

(21) Appl. No.: 09/325,538

(22) Filed: Jun. 4, 1999

(30) Foreign Application Priority Data

Jun. 5, 1998 (JP) .................................................. 10-157223

(51) Int. Cl.[7] .......................... G02F 1/1343; G02F 1/136; G02F 1/1333
(52) U.S. Cl. .............................. 349/38; 349/43; 349/139; 349/138
(58) Field of Search .............................. 349/139, 43, 138, 349/113, 38

(56) References Cited

U.S. PATENT DOCUMENTS

| | | | |
|---|---|---|---|
| 5,659,375 | * 8/1997 | Yamashita et al. | 349/38 |
| 5,745,195 | * 4/1998 | Zhang | 349/38 |
| 5,852,488 | * 12/1998 | Takemura | 349/38 |
| 5,917,563 | * 6/1999 | Matsushima | 349/38 |
| 5,955,744 | * 9/1999 | Gu et al. | 257/59 |

FOREIGN PATENT DOCUMENTS 10-206886   8/1998   (JP) .

* cited by examiner

*Primary Examiner*—William L. Sikes
*Assistant Examiner*—Toan Ton
(74) *Attorney, Agent, or Firm*—Pillsbury Winthrop LLP

(57) ABSTRACT

Not only a signal line (27a) but also an adjacent signal line (27b) partly oppose a reflection pixel electrode (50a) through an insulating film to be capacitively coupled to the electrode. The area of that portion (27a1) of the signal line (27a) which opposes the reflection pixel electrode (50a) is almost equal to that of that portion (27b2) of the signal line (27b) which oppose the pixel electrode (50a). Therefore, the influence of the signal potential of the signal line (27a) on the reflection pixel electrode (50a) through capacitive coupling is nearly equal to that of the signal potential of the signal line (27b) on the reflection pixel electrode (50a) through capacitive coupling. Luminance differences between adjacent pixels (50a and 50b; 50b and 50c, . . . ) are reduced, thereby preventing crosstalk.

8 Claims, 6 Drawing Sheets

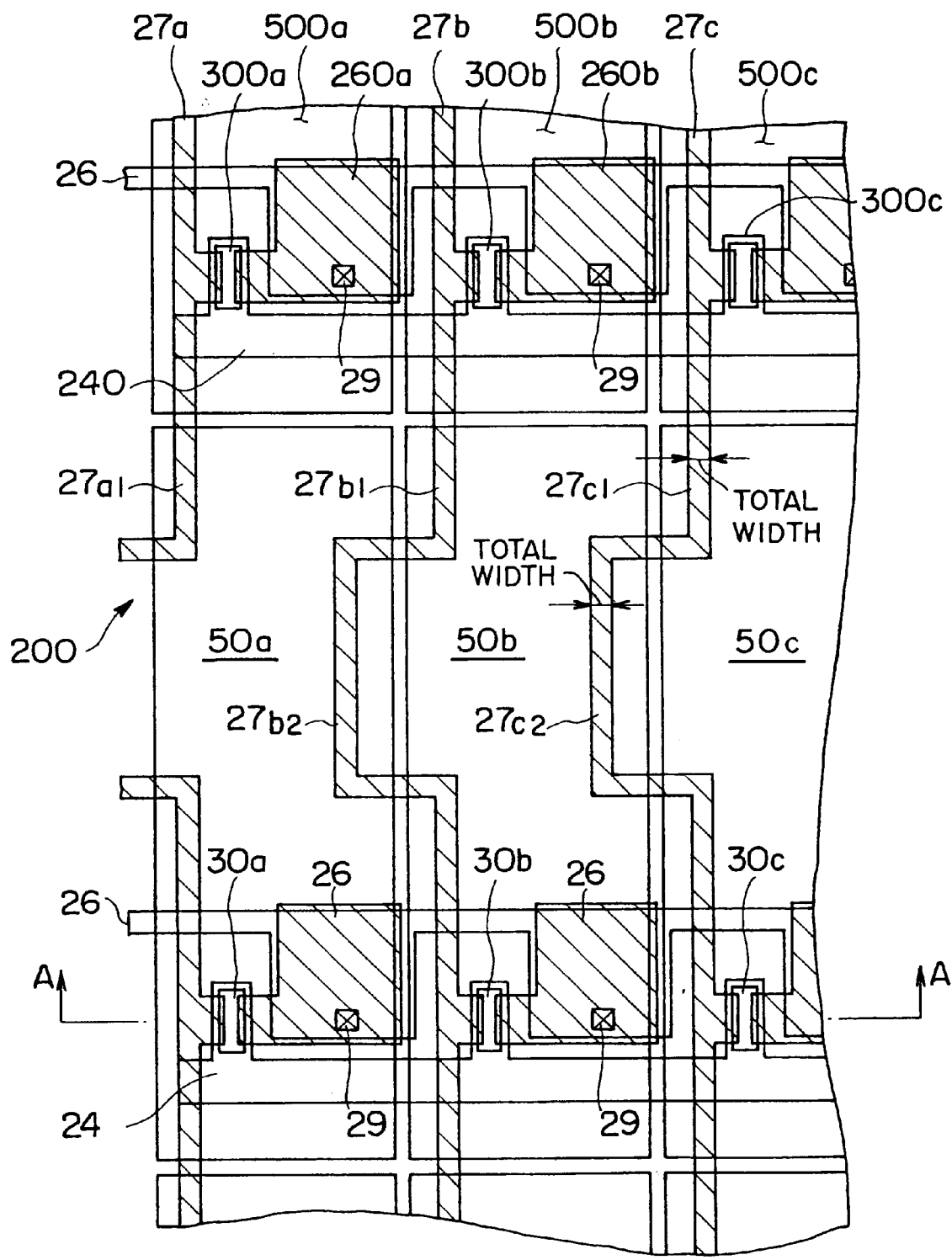
F I G. 1

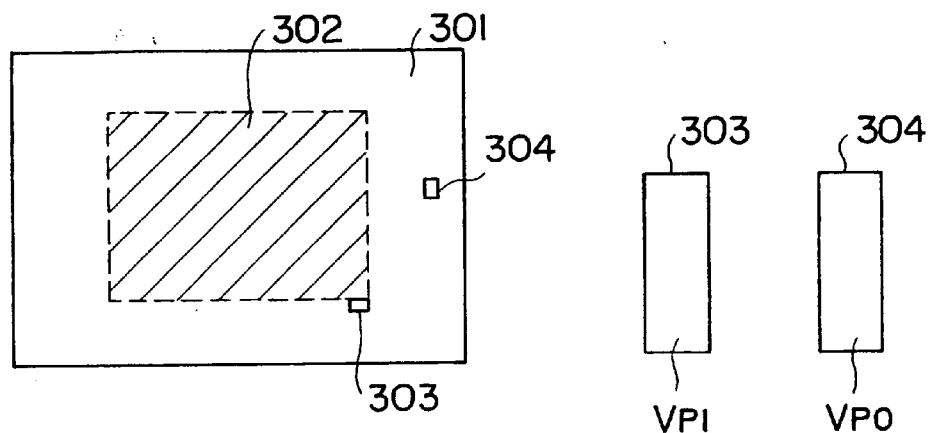
F I G. 6A          F I G. 6B
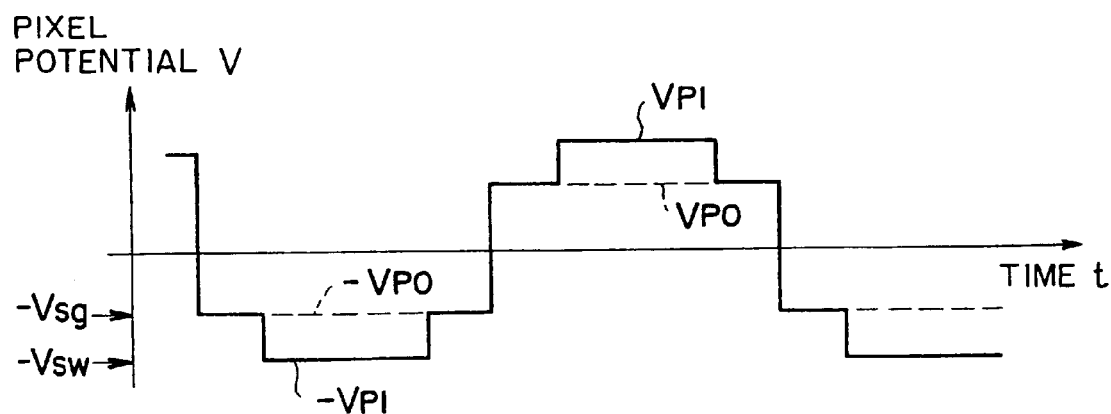
F I G. 7

ACTIVE MATRIX LCD WITH PIXELS ALTERNATELY OVERLAPPED WITH DATA LINES

BACKGROUND OF THE INVENTION

The present invention relates to a liquid crystal apparatus.

FIG. 4 is a plan view showing a reflection liquid crystal display apparatus 100 associated with the present invention. FIG. 5 is a longitudinal sectional view taken along a line B—B in FIG. 4. This apparatus includes an array substrate 110 on which thin-film transistors (to be referred to as TFTs hereinafter) 114 are arranged as switching elements in the form of a matrix, a counter-substrate 130 on which a transparent counter-electrode 136 is formed, and a liquid crystal layer 150 sandwiched between the substrates 110 and 130.

On the array substrate 110, a plurality of scanning lines 113 and a plurality of signal lines 119 run. The scanning lines 113 run along the column direction. The gates of TFTs 114 of each row are commonly connected to one scanning line 113. The signal lines 119 run in the row direction perpendicular to the column direction. One terminal of the source and drain of each TFT 114 of each row is commonly connected to one signal line 119. The other terminal of each TFT 114 forms a capacitance for storing a signal together with a signal storage capacitance line 116 through an insulating film, and is connected to a reflection pixel electrode 120 (to be described later) through a contact 125.

An organic insulating layer 118 is formed on the upper surfaces of the scanning lines 113, the signal storage capacitance lines 116, and the TFTs 114. The reflection pixel electrodes 120 are formed on the upper surface of the organic insulating layer 118 in correspondence with the respective pixels.

A color filter 134 and the common electrode 136 are stacked on the upper surface of a substrate 132. Red, blue, and green portions are arranged on the color filter 134 in nits of pixels. An optical film 188 such as a retardation plate or polarizing plate is bonded to the opposite surface of the substrate 132 to the liquid crystal layer 150.

As described above, the reflection liquid crystal display apparatus 100 has the reflection pixel electrodes 120 formed on the upper surfaces of the TFTs 114 and signal storage capacitance lines 116 through the organic insulating layer organic insulating layer 118. This can increase the area of the reflection pixel electrodes 120 by which light incident from above in FIG. 4 is reflected. As a consequence, a bright image can be displayed even in a dark place without any backlight.

The following problem, however, arises in the above liquid crystal display apparatus. As shown in FIG. 6A, when a raster window 302 is displayed on a green halftone background 301, vertical crosstalk occurs at an end portion of the window 302. Referring to FIG. 4, since the reflection pixel electrode 120 and the signal line 119 oppose through the organic insulating layer 118, they are coupled via a capacity. However, only one signal line 119 that is connected to a given reflection pixel electrode 120 is coupled via a capacity to this electrode 120.

For this reason, even on the green halftone background 301 to be uniformly display in green, owing to capacitive coupling, the signal lines 119 have different influences on the reflection pixel electrode 120 at a pixel 303 adjacent to a lower portion of the raster window 302 and a pixel 304 spaced apart from the raster window 302. More specifically, at the pixel 304 adjacent to the raster window 302 in the vertical direction, since a signal potential is applied to the signal line 119 to display the raster window 302, the reflection pixel electrode 120 is influenced by the signal line 119 through the capacitive coupling.

Assume that a voltage VP1 is applied to the pixel 303 owing to the influence of the raster window 302, and a prescribed voltage VP0 is applied to the pixel 304, as shown in FIG. 6B. The pixel potentials respectively applied to the pixels 303 and 304 change with time, as shown in FIG. 7.

Let Vsg be the signal potential for a halftone image, Vsb be the signal potential for a black image, and Vsw be the signal potential for raster window display. In addition, let Pco be the coupling factor between a given pixel and a signal line connected thereto through a TFT, and Pci be the coupling factor between the ith signal line adjacent to this signal line and the corresponding pixel. Then, the voltages VP1 and VP0 can be expressed as $$VP0 = Vsg \qquad (1)$$

$$VP1 = Vsg + Pc0(Vsb-Vsg) + Pc1(Vsw-Vsg) + Pc2(Vsb-Vsg) + Pc3(Vsw-Vsg) + \ldots = Vsg + (Pc0+Pc2+PC4+ \ldots)(Vsb-Vsg) + (Pc1+Pc3+PC5+ \ldots)(Vsw-Vsg) \qquad (2)$$

As a result, since the effective voltage at the pixel electrode 120 at the pixel 303 differs from that at the pixel electrode 120 at the pixel 304, and a luminance difference is produced, crosstalk occurs. This problem also arises in a transmission liquid crystal display apparatus.

SUMMARY OF THE INVENTION

It is, therefore, an object of the present invention to provide a liquid crystal display apparatus which can prevent crosstalk.

According to the present invention, there is provided a liquid crystal display apparatus comprising an array substrate including a substrate, a plurality of scanning lines formed on the substrate to run in a column direction, a plurality of signal lines formed on the substrate to run in a row direction, a plurality of switching elements formed near intersections of the signal lines and the scanning lines, and a plurality of pixel electrodes which are respectively connected to the switching elements and run in both the row and column directions, a counter-substrate opposing the array substrate, and a liquid crystal sandwiched between the array substrate and the counter-substrate, wherein each of the signal lines is alternately overlapped with pixel electrodes in a predetermined row and pixel electrodes in a row different from the predetermined row.

In this case, the pixel electrode may be a reflection electrode.

It is preferable that the area of the signal line overlapped with the pixel electrode in the predetermined row be substantially equal to that of the signal line overlapped with the pixel electrodes in the row different form the predetermined row.

The pixel electrodes are formed on an insulating interlayer formed on the switching elements.

The insulating interlayer may be made of an organic resin.

In addition, according to the present invention, there is provided a liquid crystal display apparatus comprising an array substrate including a substrate, a plurality of scanning lines formed on the substrate to run in a column direction, a plurality of signal lines formed on the substrate to run in a row direction, a plurality of switching elements formed near intersections of the signal lines and the scanning lines, and a plurality of pixel electrodes which are respectively connected to the switching elements and run in both the row and column directions, a counter-substrate opposing the array substrate, and a liquid crystal sandwiched between the array substrate and the counter-substrate, wherein each of the pixel electrodes is overlapped with a plurality of signal lines, and total widths of portions of the signal lines are overlapped with the pixel electrode.

The pixel electrode may be a reflection electrode.

It is preferable that the areas of the plurality of signal lines overlapped with the pixel electrode be substantially equal to each other.

According to the above liquid crystal display apparatus of the present invention, since each signal line is overlapped with the pixel electrodes in a predetermined row and the pixel electrodes in a row different from the predetermined row, a plurality of pixel electrodes are capacitively coupled to each signal line. This can reduce luminance differences between the pixel electrodes and prevent crosstalk.

BRIEF DESCRIPTION OF THE DRAWINGS

FIG. 1 is a cross-sectional view showing the structure of a liquid crystal display apparatus according to the first embodiment of the present invention in the planar direction;

FIGS. 6A and 6B are views for explaining a window and its peripheral area displayed on a screen; and FIG. 7 is a timing chart showing changes in signal voltages applied to pixel electrodes of the liquid crystal display apparatus associated with the present invention with time.

DESCRIPTION OF THE PREFERRED EMBODIMENT

An embodiment of the present invention will be described below with reference the accompanying drawings.

Figure 2:
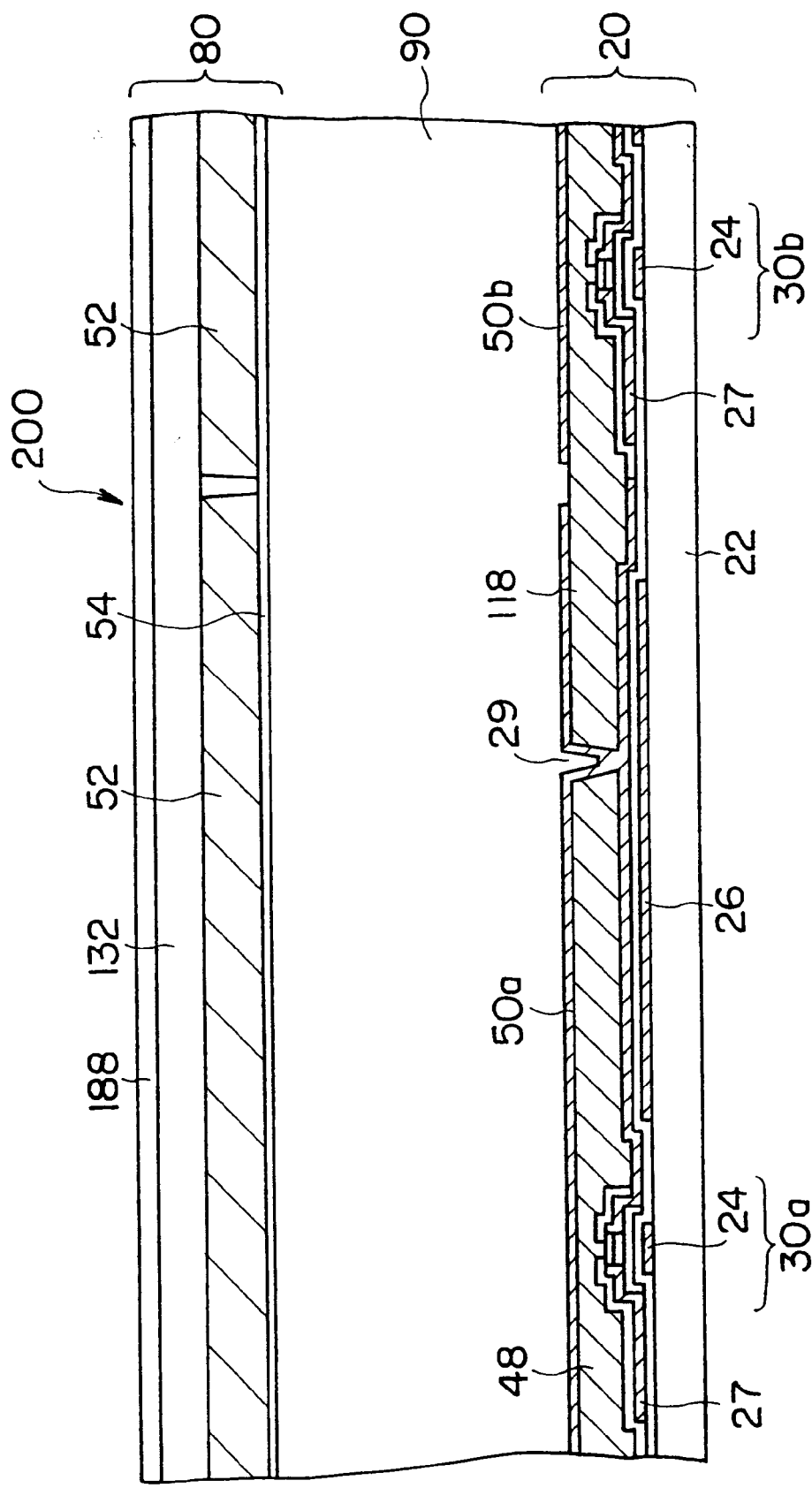
FIG. 2 is a sectional view showing a longitudinal sectional structure taken along a line A—A in FIG. 1.

FIG. 1 shows the cross-sectional structure of a liquid crystal display apparatus according to this embodiment. FIG. 2 shows a longitudinal structure taken along a line A—A in FIG. 1. An apparatus 200 includes an array substrate 20 on which TFTs 30a, 30b, 30c, . . . , 300a, 300b, 300c, . . . are arranged as switching elements, a counter-substrate 80 on which a transparent counter-electrode 54 is formed, and a liquid crystal layer 90 sandwiched between the substrates 20 and 80. The array substrate 20 has scanning lines 24, 240, . . . and signal lines 27a, 27b, 27c, . . . formed on a substrate 22. The scanning lines 24, 240, . . . run along the column direction (horizontal direction in FIG. 1). The gates of the TFTs 30a, 30b, 30c, . . . , 300a, 300b, 300c, . . . in the respective columns are commonly connected to the corresponding scanning lines. The signal lines 27a, 27b, 27c, . . . run along the row direction (vertical direction in FIG. 1) perpendicular to the column direction. In such cases, one terminal of the source and drain of each of the TFTs 30a, 300a, . . . is commonly connected to the signal line 27a. One terminal of each of the TFTs 30b, 300b, . . . is commonly connected to the signal line 27b. One terminal of each of the TFTs 30c, 300c, . . . is commonly connected to the signal line 27c. The other terminal of each of the TFTs 30a, 30b, 30c, . . . , 300a, 300b, 300c, . . . forms a capacitance together with a signal storage capacitance line 26 through an insulating film, and is further connected to pixel electrodes 50a, 50b, 50c, . . . , 500a, 500b, 500c, . . . through a contact 27.

More specifically, each of the TFTs 30a, 30b, 30c, 300a, 300b, 300c, . . . has a semiconductor layer on which a channel region is formed and a low-resistance semiconductor layer is located on two ends of the semiconductor layer and connected to source and drain electrodes by ohmic contact. The source and drain electrodes are connected to the low-resistance semiconductor layer, and one of the electrodes is connected to the pixel electrodes 50a, 50b, 50c, . . . , 500a, 500b, 500c, . . . through a contact hole 29.

A passivation film (not shown) is formed on the upper surfaces of the scanning lines 24, 240, . . . , signal lines 27a, 27b, 27c, . . . , and TFTs 30a, 30b, 30c, . . . , 300a, 300b, 300c, . . . , and an organic insulating layer 118 made of an acrylic resin is formed on the passivation film. The reflection pixel electrodes 50a, 50b, 50c, . . . , 500a, 500b, 500c, . . . are formed on the upper surface of the organic insulating layer 118 in correspondence with the respective pixels. The reflection pixel electrodes 50a, 50b, 50c, . . . , 500a, 500b, 500c, . . . are made of a high-reflectance material such as silver, aluminum, or an alloy thereof to have the effect of reflecting external light incident from above in FIG. 1.

The counter-substrate 80 has a color filter 52 and a common electrode 54 stacked on the upper surface of a substrate 132. Red, blue, and green portions are arranged on the color filter 52 in units of pixels. An optical film 188 such as a retardation plate or polarizing plate is bonded to the opposite surface of the substrate 132 to the liquid crystal layer 90. For example, a material such as a nematic liquid crystal can be used for the liquid crystal layer 90.

The signal potentials to be applied to the reflection pixel electrodes 50a, 50b, . . . are switched in units of pixels by the TFTs 30a, 30b, . . . formed on the array substrate 20. External light incident from above through the counter-substrate 80 is reflected by the reflection pixel electrodes 50a, 50b, . . . , and the transmittance is controlled by the liquid crystal layer 90 in units of pixels, thereby forming a predetermined image.

Figure 4:
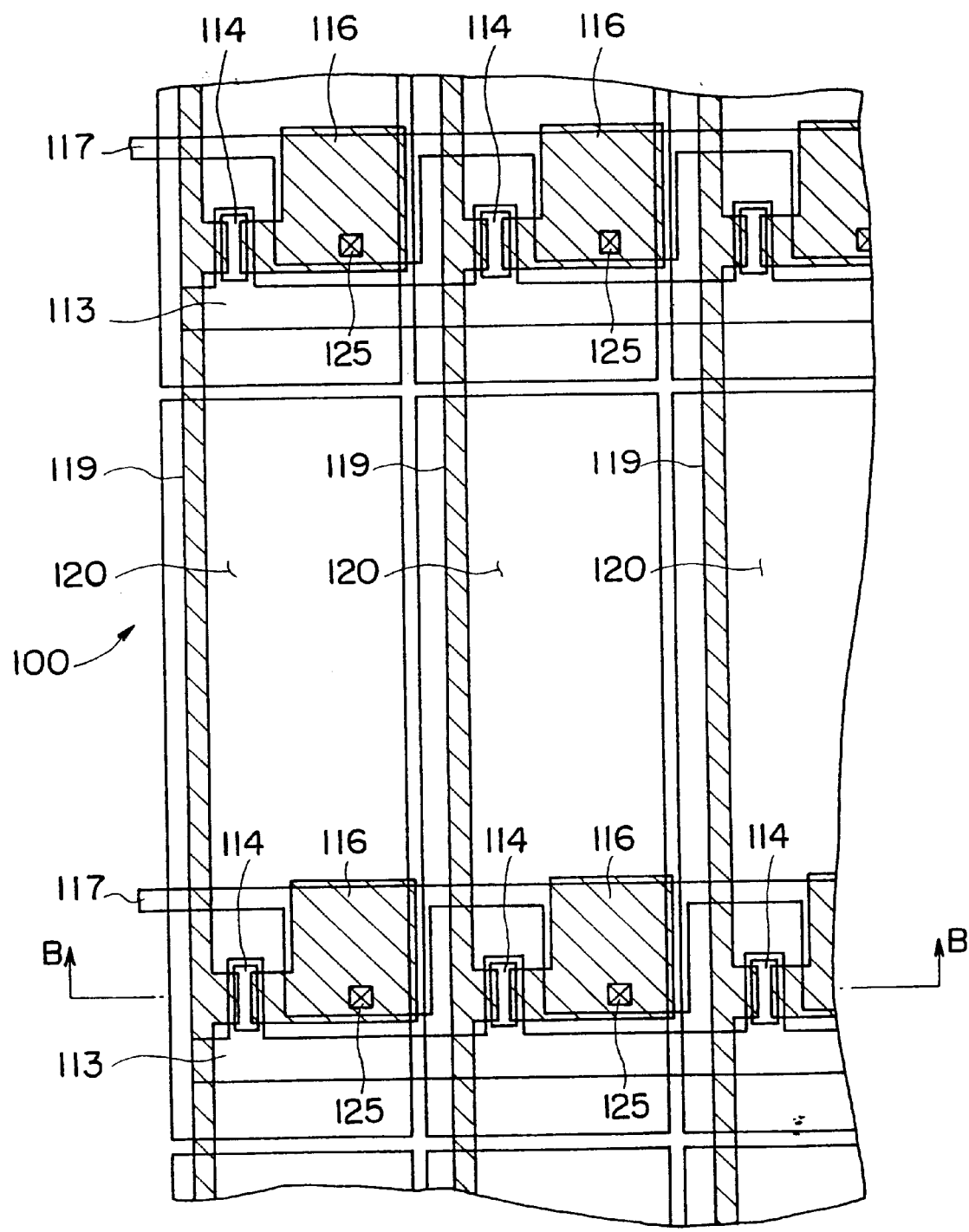
FIG. 4 is a cross-sectional view showing the structure of a liquid crystal display apparatus associated with the present invention in the planar direction.
Figure 5:
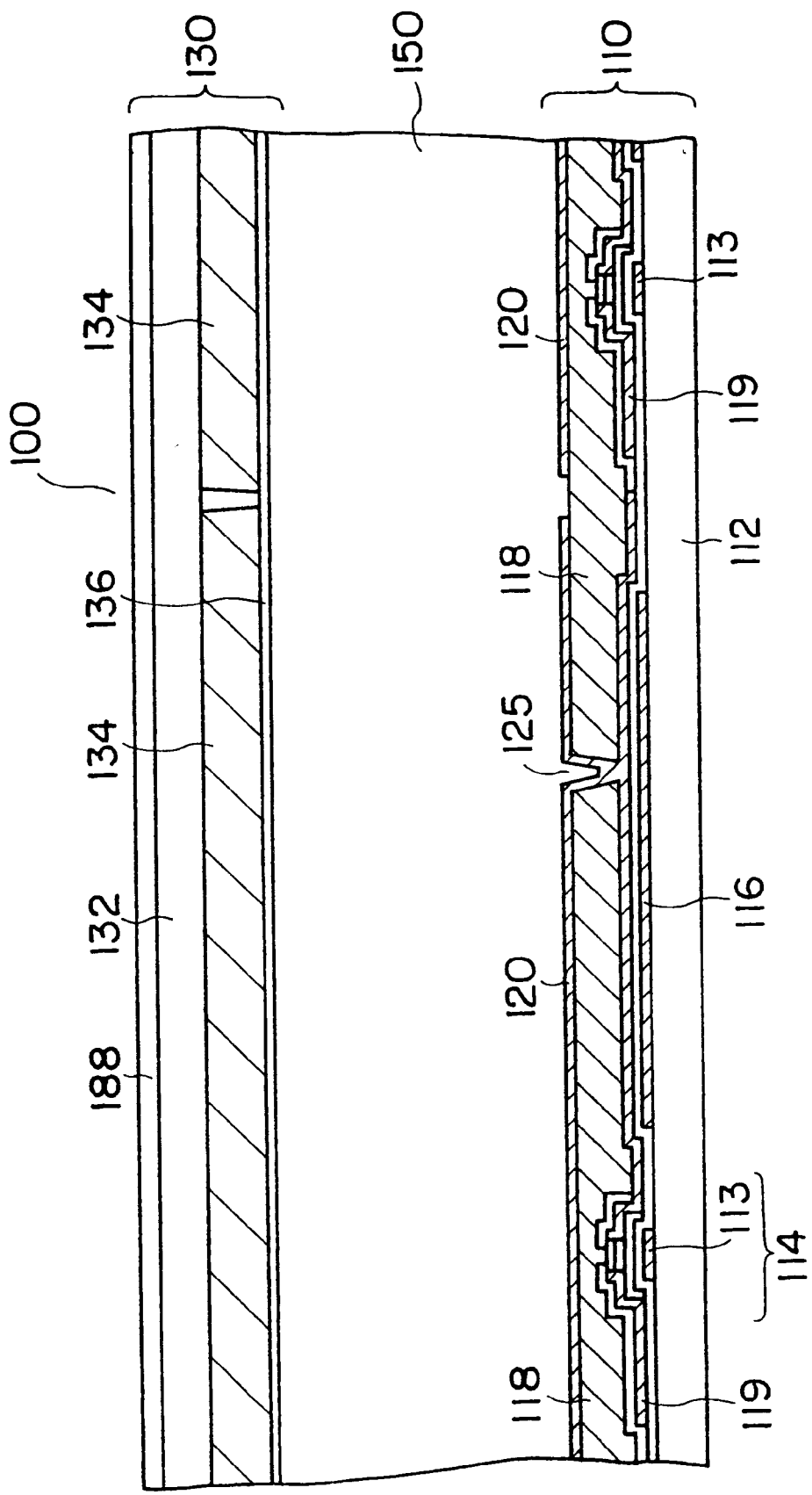
FIG. 5 is a sectional view showing a longitudinal sectional structure taken along a line B—B in FIG. 1.

Unlike the conventional apparatus shown in FIGS. 4 and 5, according to this embodiment, two signal lines are formed underneath each of the reflection pixel electrodes 50a, 50b, 50c, . . . , 500a, 500b, 500c, . . . , to oppose it through the organic insulating layer 118. For example, not only a portion 27a1 of the signal line 27a that corresponds to the reflection pixel electrode 50a but also a portion 27b2 of the signal line 27b that corresponds to an adjacent pixel oppose the reflection pixel electrode 50a. Not only a portion 27b1 of the signal line 27b that corresponds to the reflection pixel electrode 50b but also a portion 27c2 of the signal line 27c that corresponds to an adjacent pixel oppose the reflection pixel electrode 50b. In addition, the area of the portion 27a1 of the signal line 27a that opposes the reflection pixel electrode 50a is almost equal to that of the portion 27b2 of the signal line 27b. Likewise, the area of the portion 27b1 of the signal line 27b that opposes the reflection pixel electrode 50b is almost equal to that of the portion 27c2 of the signal line 27c.

With this arrangement, each of the reflection pixel electrodes 50a, 50b, 50c, . . . , 500a, 500b, 500c, . . . is coupled via a capacity to two signal lines of the signal lines 27a, 27b, 27c, ... through the insulating film 118. For example, the reflection pixel electrode 50a is coupled via a capacity to the signal lines 27a and 27b with almost equal areas, and the adjacent reflection pixel electrode 50b is coupled via a capacity to the signal lines 27b and 27c with almost equal areas. For this reason, any luminance difference between a given reflection pixel electrode and an adjacent reflection pixel electrode is reduced to prevent crosstalk. As a result, when a raster window 302 is displayed on a green halftone background 301 as shown in FIG. 6A, the voltage applied to a pixel 303 adjacent to the lower side of the raster window 302 is influenced by the voltage for displaying the window less than in the prior art, and hence becomes close to a prescribed voltage VP0 applied to a pixel 304 in another region. This prevents vertical crosstalk at an end portion of the window 302.

Figure 3:
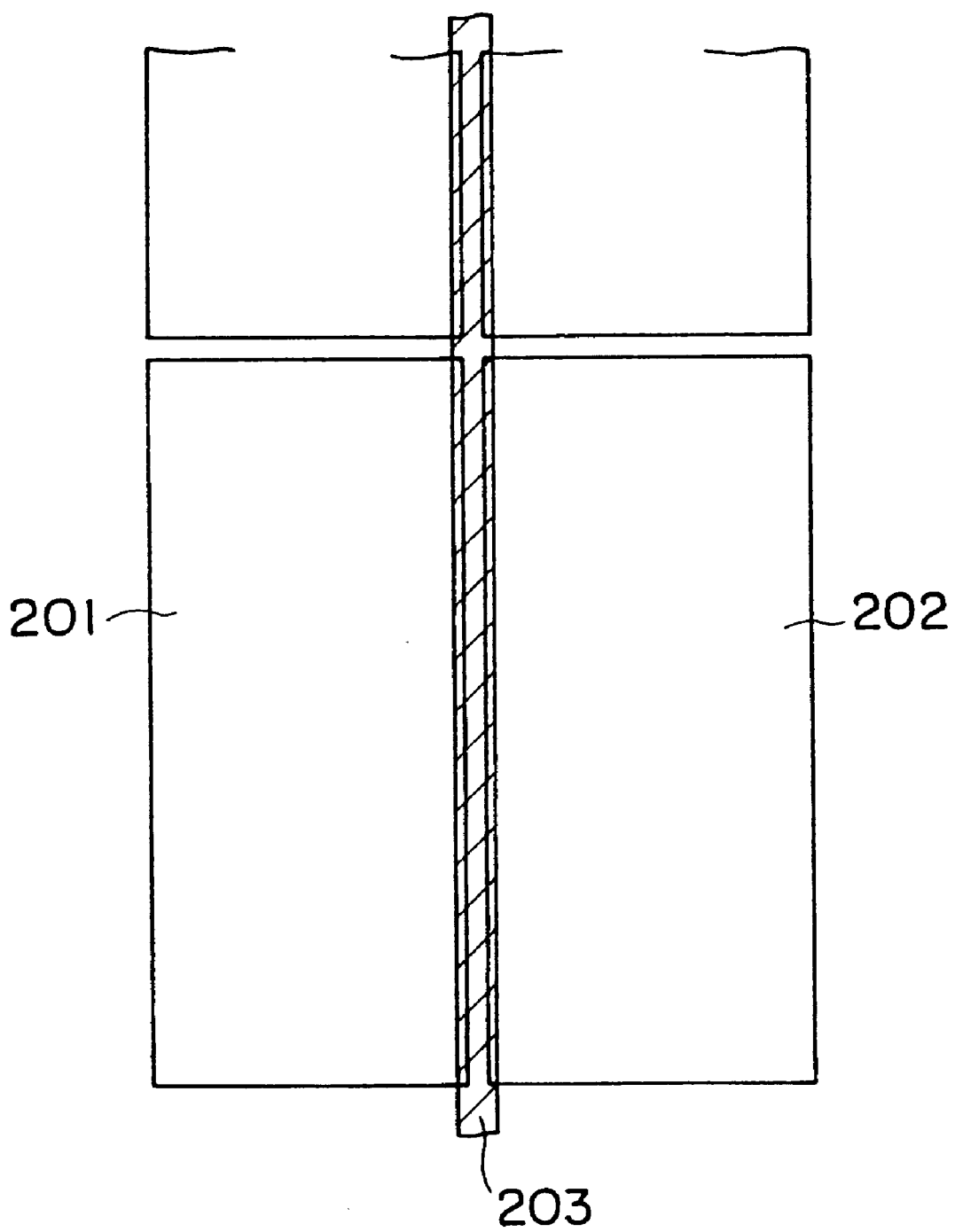
FIG. 3 is plan view showing how one signal line is placed between two pixel electrodes in the liquid crystal display apparatus.

To uniformly couple one signal line to two pixel electrodes via a capacity, for example, as shown in FIG. 3, one signal line 203 may be placed between two pixel electrodes 201 and 202. With this arrangement, the influences of the potential of the signal line 203 which are exerted on the two pixel electrodes 201 and 202 through capacitive coupling can be made uniform.

If, however, the signal line 203 is not completely covered under the pixel electrode 201 or 202, a liquid crystal layer portion at a portion where no pixel electrode is present responds to the potential of the signal line 203 and the counter-potential. As a result, undesired display is performed on the signal line 203. Therefore, each signal line must be completely covered with only each of the pixel electrodes as in the above embodiment, unlike the arrangement shown in FIG. 3. Consider the pixel electrode 50b in FIG. 1. The pixel electrode 50b must be overlapped with an area including the total width of the signal line 27b1 and an area including the total with of the signal line 27c2. In this case, the total width of a signal line is the width of the signal line in a direction perpendicular to the row direction, as shown in FIG. 1.

The embodiment described above should be considered as an example but does not limit the present invention. For example, in the above embodiment, one pixel electrode and two signal lines are arranged to oppose each other. However, the number of signal lines is not limited to two, and three or more signal lines may be arranged to oppose one pixel electrode. With this arrangement, the same function and effect can be obtained. If, however, the number of signal lines increases, the length of signal lines increases, resulting in an increase in interconnection area. In general, therefore, the number of signal lines is preferably three or less.

Although this embodiment is associated with a reflection liquid crystal display apparatus, crosstalk in a transmission liquid crystal display apparatus can also be prevented by applying the present invention thereto. In a transmission liquid crystal display apparatus, however, it tends to become difficult to ensure a sufficient aperture ratio when each pixel electrode has transparency and two or more signal lines are formed below one pixel electrode. In contrast to this, as in the above embodiment, in a reflection liquid crystal display apparatus, since the pixel electrodes are opaque reflection pixel electrodes, even if a plurality of signal lines are formed beneath one pixel, they exert no influence on the aperture ratio, and high-luminance display can be performed.

What is claimed is:

1. A liquid crystal display apparatus comprising:

an array substrate including a substrate, a plurality of scanning lines formed on said substrate to run in a column direction, a plurality of signal lines formed on said substrate to run in a row direction, a plurality of switching elements formed near intersections of said signal lines and said scanning lines, and a plurality of pixel electrodes which are respectively connected to said switching elements and run in both the row and column directions;

a counter-substrate opposing said array substrate; and a liquid crystal sandwiched between said array substrate and said counter-substrate, wherein each of said signal lines is alternately overlapped with the pixel electrodes in a predetermined row and the pixel electrodes in a row different from the predetermined row.

2. The apparatus according to claim 1, wherein said pixel electrode is a reflection electrode.

3. The apparatus according to claim 1, wherein an area of said signal line overlapped with the pixel electrode in the predetermined row is substantially equal to that of the signal line overlapped with the pixel electrodes in the row different form the predetermined row.

4. The apparatus according to claim 1, wherein said pixel electrodes are formed on an insulating interlayer formed over said switching elements.

5. The apparatus according to claim 4, wherein said insulating interlayer is made of an organic resin.

6. A liquid crystal display apparatus comprising:

an array substrate including a substrate, a plurality of scanning lines formed on said substrate to run in a column direction, a plurality of signal lines formed on said substrate to run in a row direction, a plurality of switching elements formed near intersections of said signal lines and said scanning lines, and a plurality of pixel electrodes which are respectively connected to said switching elements and run in both the row and column directions;

a counter-substrate opposing said array substrate; and a liquid crystal sandwiched between said array substrate and said counter-substrate, wherein each of said pixel electrodes overlaps with a plurality of signal lines, and total widths of portions of said signal lines are overlapped with said pixel electrode.

7. The apparatus according to claim 6, wherein said pixel electrode is a reflection electrode.

8. The apparatus according to claim 6, wherein areas of the plurality of signal lines overlapped with said pixel electrode are substantially equal to each other.

* * * * *